Figure 3:
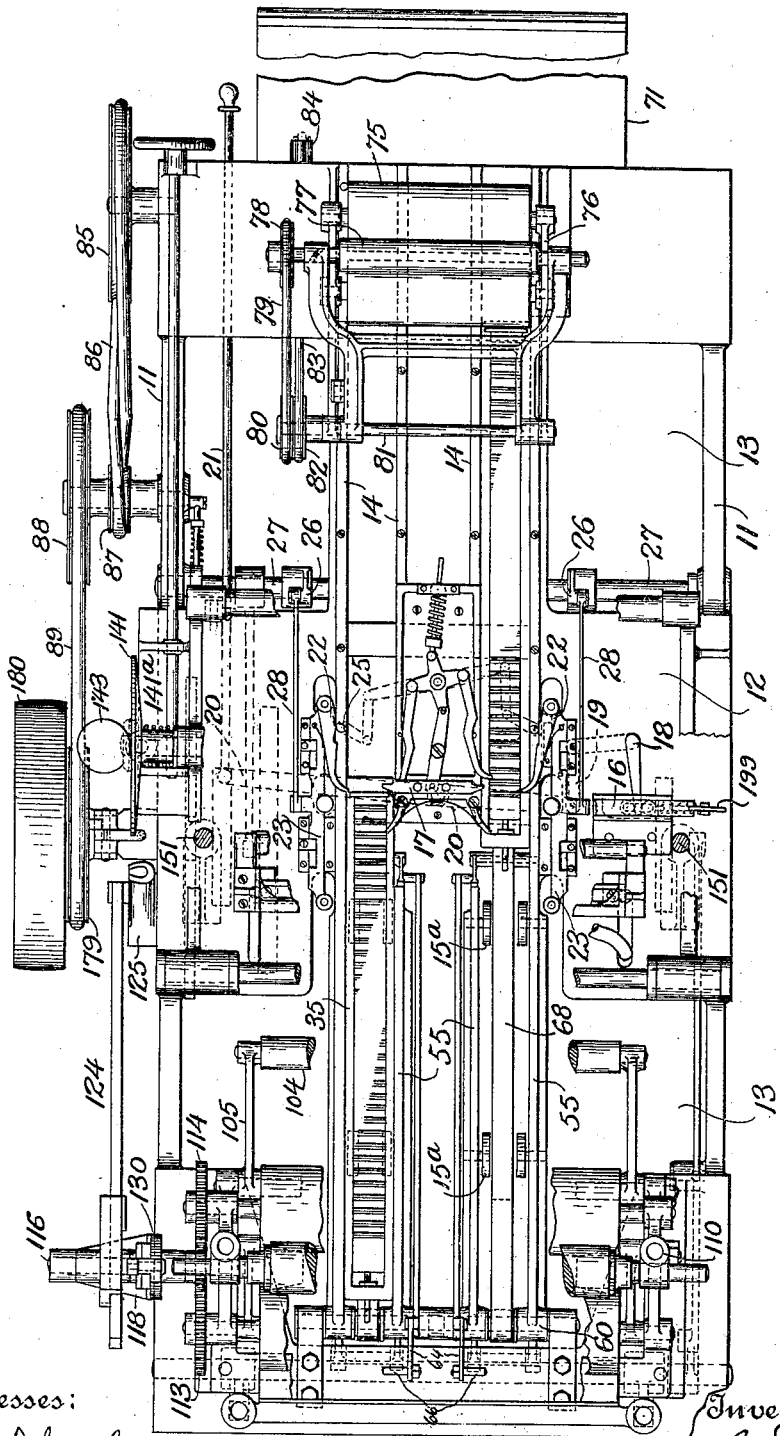

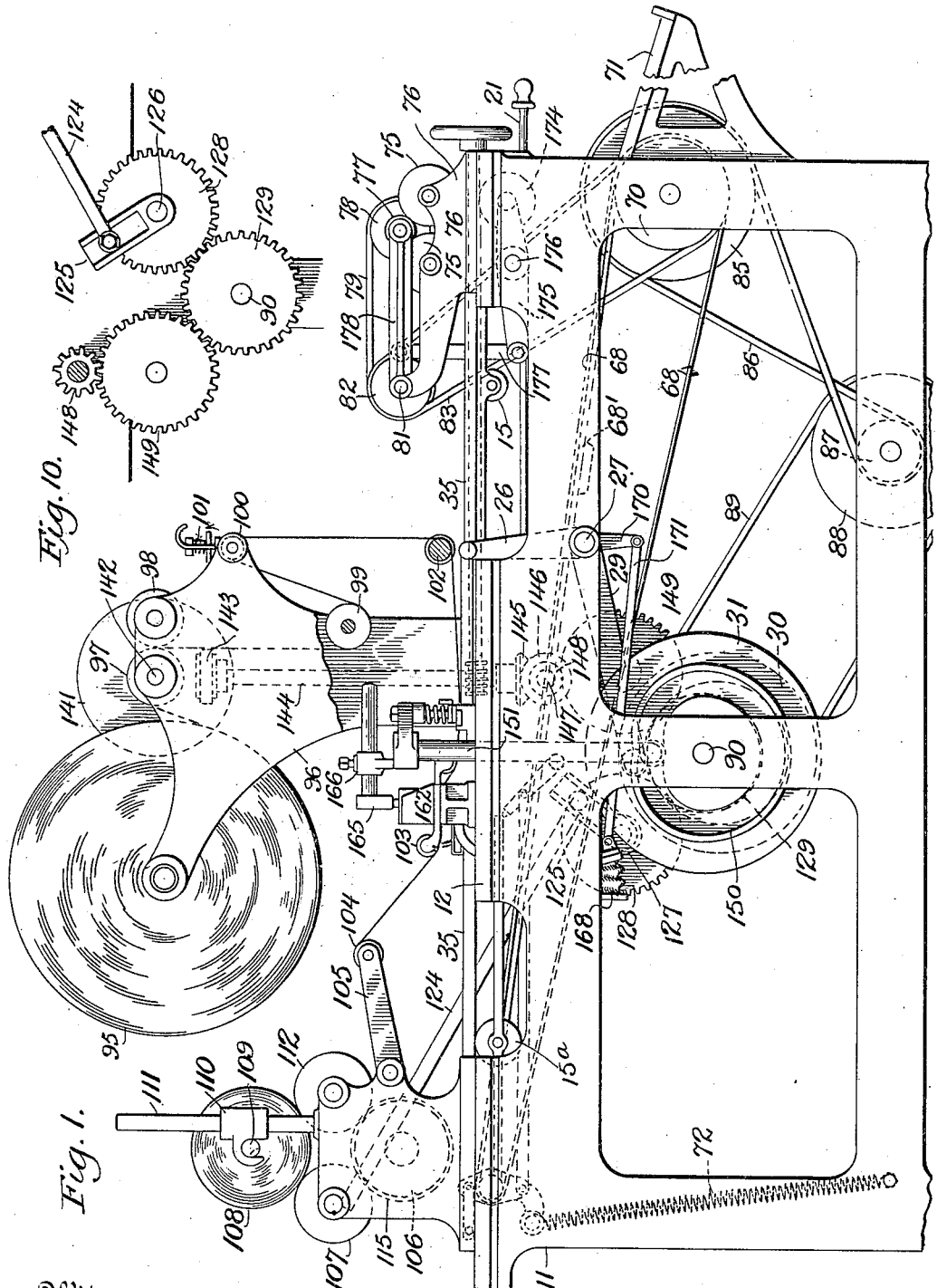

No. 768,823. PATENTED AUG. 30, 1904.
E. P. SHELDON & W. B. STORY.
ADDRESSING MACHINE.
APPLICATION FILED OCT. 24, 1903.
NO MODEL. 6 SHEETS—SHEET 2.
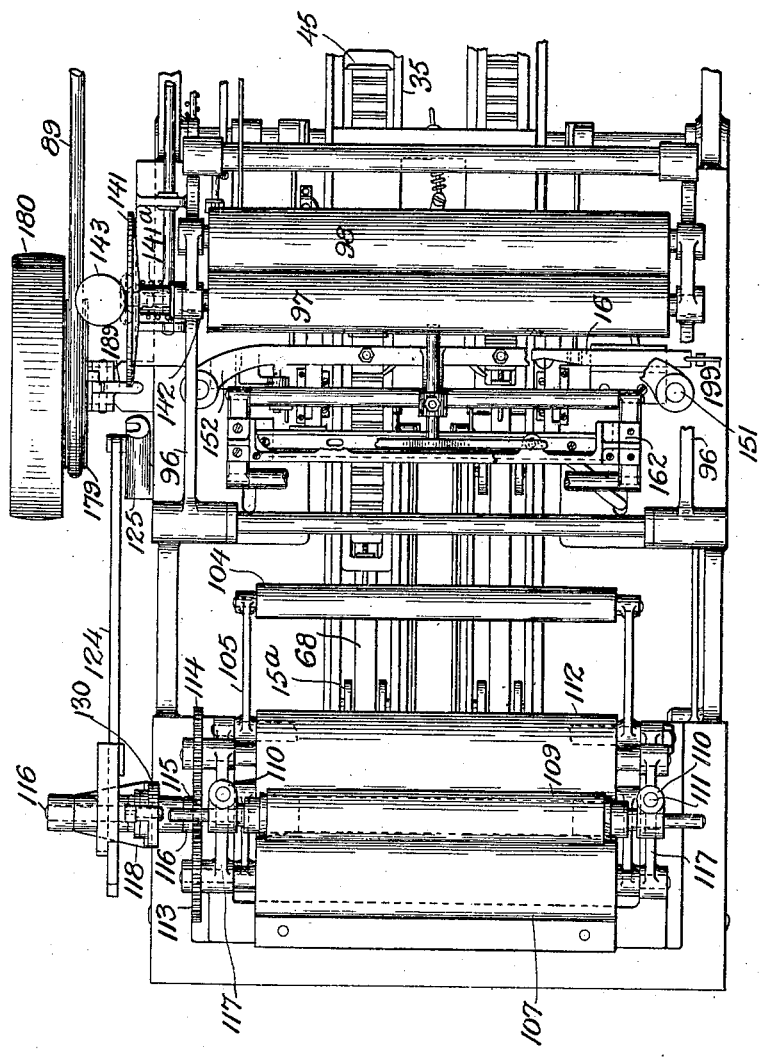
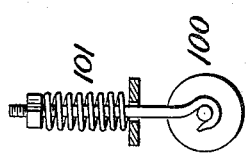
Witnesses: Inventors:
James F. Duhamel Edward P. Sheldon
Wm. N. MacLean Ward B. Story
By their Attorney
Edmond Conegar Brown

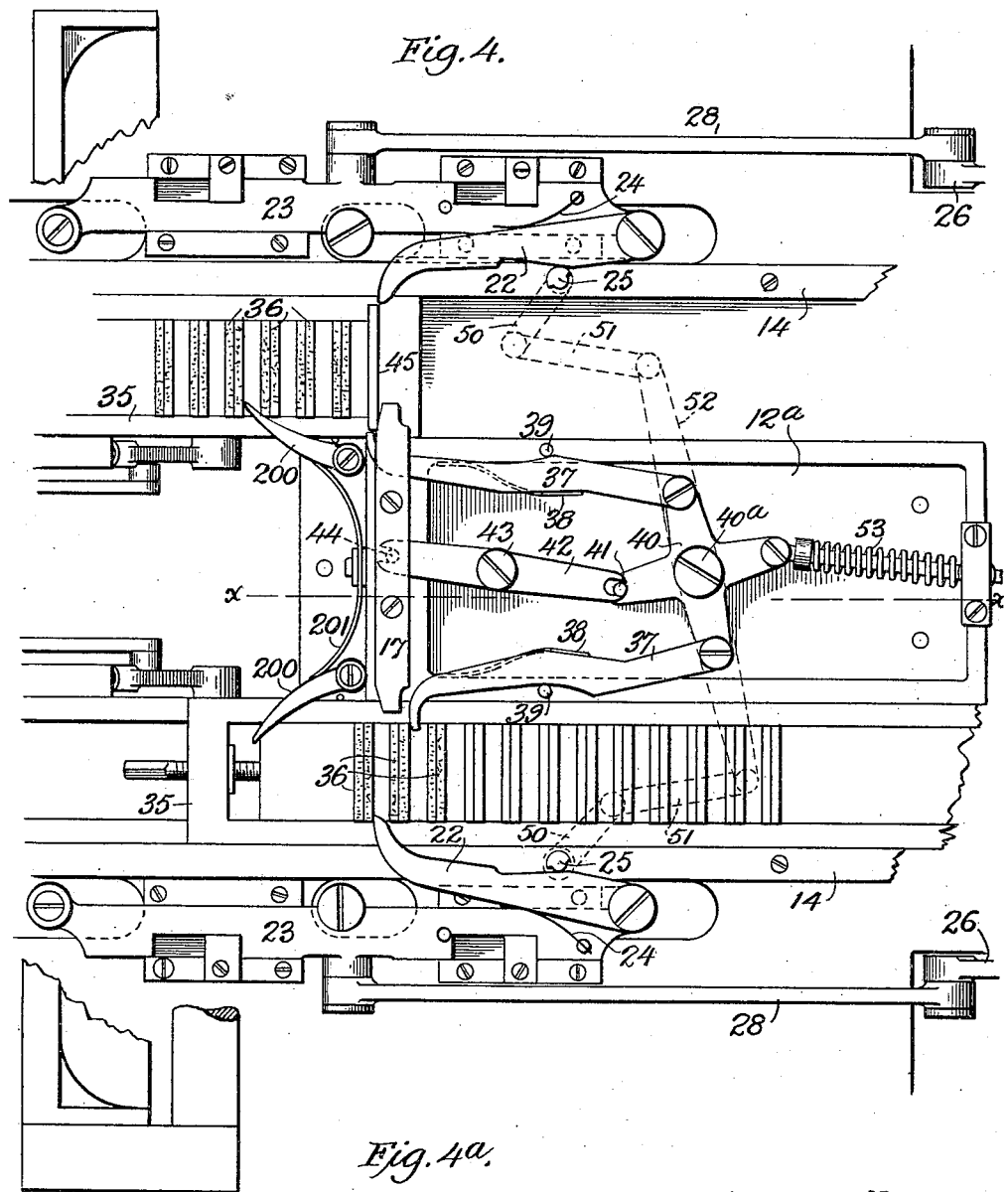

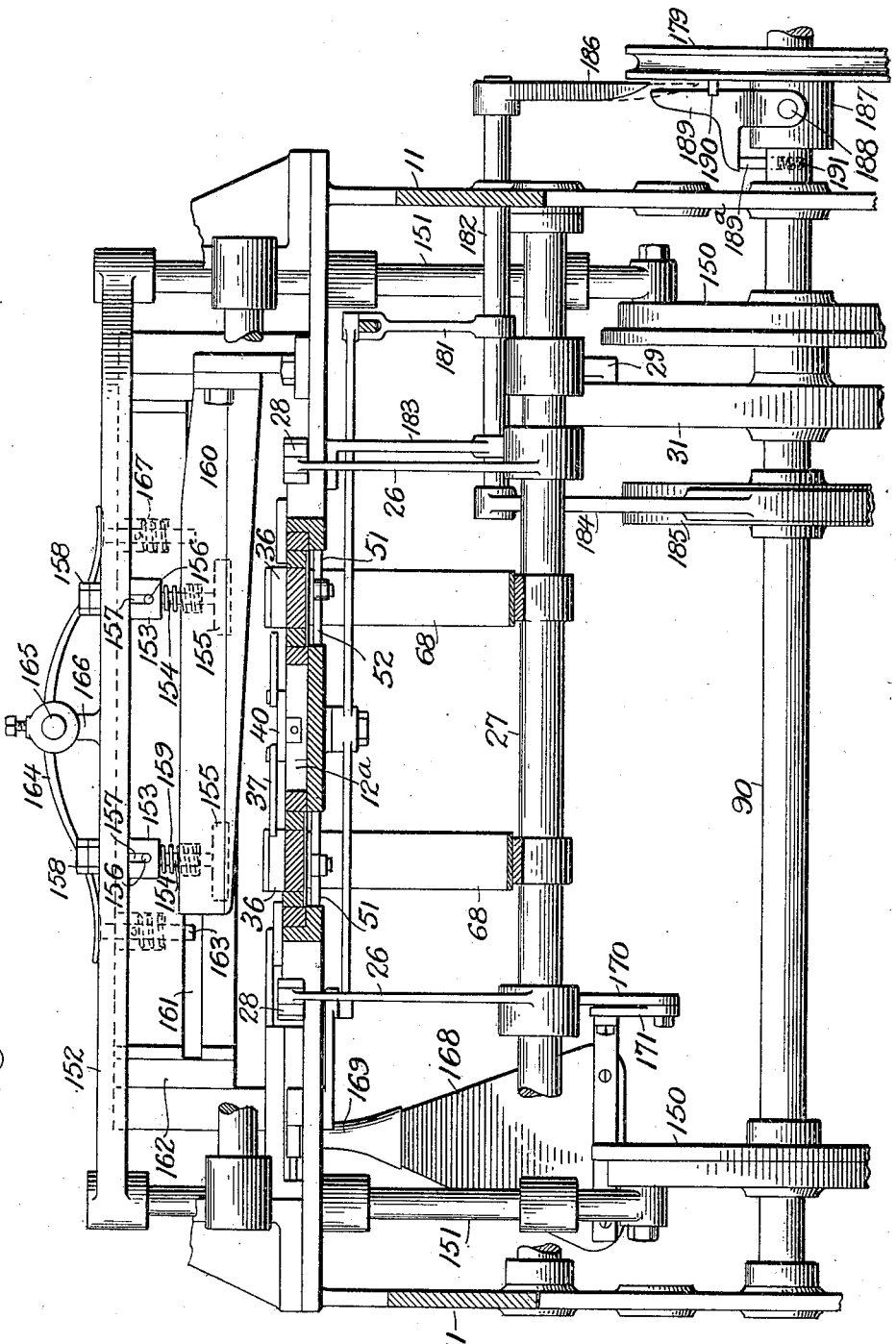

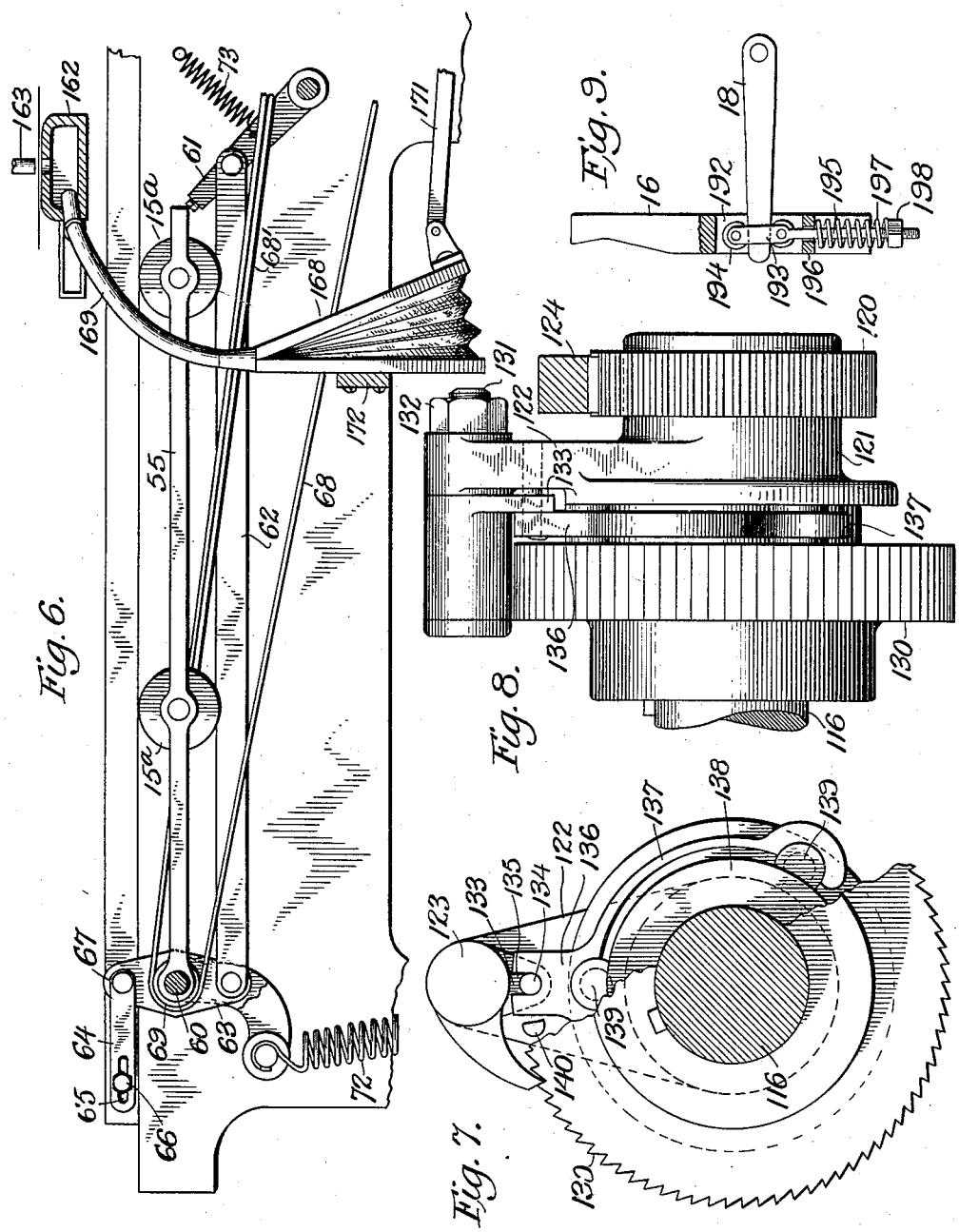

No. 768,823. Patented August 30, 1904.

UNITED STATES PATENT OFFICE.

EDWARD P. SHELDON AND WARD B. STORY, OF NEW YORK, N. Y.; SAID STORY ASSIGNOR TO SAID SHELDON.

ADDRESSING-MACHINE.

SPECIFICATION forming part of Letters Patent No. 768,823, dated August 30, 1904.

Application filed October 24, 1903. Serial No. 178,398. (No model.)

*To all whom it may concern:*

Be it known that we, EDWARD P. SHELDON and WARD B. STORY, both citizens of the United States, and residents of the borough of Brooklyn, county of Kings, city and State of New York, have invented certain new and useful Improvements in Addressing-Machines, of which the following is a specification.

The invention relates to devices for automatically printing upon wrappers or envelops in which newspapers or other articles are to be inclosed the names and addresses of persons who are to receive same.

The invention consists in the novel construction, arrangement, and combination of devices and parts, which is hereinafter and in the accompanying drawings particularly shown and described.

In the drawings accompanying this specification and forming a part thereof like reference characters refer to like parts.

Figure 1 is a side elevation of a machine embodying our invention. Fig. 2 is a top plan view of the rear portion of the machine. Fig. 3 is a plan view of the complete machine with the upper structure removed to more clearly show the parts carried by the bed. Fig. 4 is an enlarged view of the galley-feeding fingers and their operating parts. Fig. 4ª is a longitudinal sectional view of the same on the line $xx$ of Fig. 4. Fig. 5 is a transverse sectional view of the machine and bed in front of the two principal operating-shafts. Fig. 6 is a longitudinal sectional view through the rear end of the machine. Fig. 7 is a cross-section of the intermittent rewinding roller-shaft, showing its ratchet-wheel and pawl. Fig. 8 is a side elevation of the end of this shaft carrying the ratchet and its operative parts. Fig. 9 is a detail view of a sliding stop hereinafter referred to. Fig. 10 is an elevation of some of the gearing connected with the main driving-shaft on the side of the machine opposite to that shown in Fig. 1. Fig. 11 is a detail view of the roller for taking up the slack paper.

The particular form of machine which is the subject of the present invention is adapted to receive and feed toward the rear of the machine a long narrow galley in which are set up groups of type representing the names and addresses to be printed. The paper constituting the wrappers is also fed along from a roll and at certain intervals is depressed upon the type in the galley, which is moved intermittently between the depressions of the wrapper, so as to bring successive groups of type into the proper position for printing. The paper after printing may be either rewound into a roll or cut into separate wrappers.

The side frames 11 on each side of the machine support the working parts, and in them or extensions of them are journaled the various shafts, as hereinafter described. At the top of the machine is a horizontal part 12, having several openings 13, as shown in the plan views. This top or horizontal portion 12 serves to connect the side frames, and it also serves to support the galleys containing the addresses during a part of their course when they are passing through the machine, the openings 13 being provided to permit various operative parts to pass from the lower to the upper part of the machine. Extending longitudinally across the machine at the top are rods 14, which serve as lateral guides for the galleys. Near the front of the machine are rollers 15, and further back are other rollers or wheels, 15ª, over which the galleys pass. The galleys are introduced by hand or otherwise at the front of the machine and after passing over rollers 15 slide along the bed or top 12. The galley at the operator's left hand is pushed back until its inner end abuts against and is stopped by a laterally-slidable bar 16, as shown in Fig. 2 and partly shown in Fig. 3, the inner or abutting end, however, being broken away in the latter figure in order to expose other parts and the galley on the operator's right being pushed back until its inner end abuts against and is stopped by the bar 17. The bar 16 is operated laterally out of the path of the galley when the machine is started by one end of the pivoted L-lever 18, the other end of which is operated by the rod 19, which is pivotally attached to one end of the lever 20, the other end of which is operated by the rod 21. The means by which the other galley is released will be hereinafter described. The mechanism for feeding the galleys intermittently through the machine will now be described.

Adjacent to and outside of each of the two outer longitudinal guiding-rods 14 are feeding-fingers 22, pivotally attached to sliding pieces 23. (See Figs. 3 and 4.) Springs 24 are provided, which tend to press inward the free ends of the fingers 22, the extent of such inward movement being controlled by the revoluble eccentric studs or stops 25. The sliding pieces 23 are reciprocatingly operated by the rods 28, connected to arms or levers 26, which are fast on the shaft 27, which is pivotally mounted in the side frames, and an arm 29, also rigidly attached to said shaft 27, extends backward and downward and engages with a groove 30 in the cam-wheel 31. As the fingers 22 are reciprocated by the devices just described one of them is held out of engagement with the galleys by one of the studs 25, which is turned so as to present its longer radius to the finger, while the other finger is allowed by its stud, which is turned so as to present its shorter radius, to turn farther inward and to engage with the adjacent galley. In the drawings the finger on the left of the machine is shown in engagement and the one on the right held out of engagement. As the finger which is in engagement with the galley is moved toward the front of the machine, as above described, its end slips past one of the sets of type and on its return movement it pushes the galley forward one step in a manner which will be evident from Figs. 3 and 4, where the galley is designated 35 and the groups of type 36. As the galley is thus being fed along step by step the galley on the other side of the machine remains stationary, the adjacent feeding-finger being held out of engagement by its eccentric stud, and the said galley also is held from any accidental movement due to the vibration of the machinery by the bar 17. When the first galley has been entirely passed beyond the printing devices, however, the finger appertaining thereto is thrown out of engagement, the bar 17 is shifted laterally so as to set free the other galley, and the finger operating this galley is thrown into engagement. The mechanism by which these operations are produced will now be described.

Carried by a detachable plate 12$^a$, secured to the bed 12 about the center of the machine, are curved fingers 37, pressed outward by springs 38 against studs or stops 39. These fingers 37 are pivotally attached to the outer end of the lateral ends of a pivoted four-armed lever 40, which is secured to the bolt 40$^a$, and the rear arm of the lever 40 bears a stud 41, which engages with one end of a lever 42, pivoted at 43, the other end of which engages with a stud 44 on the under side of the rod 17. It will be evident that when either of the fingers 37 are pulled backward by the adjacent galley, which occurs when the end of the galley passes, by reason of the engagement of the ridge or stop 45 with the end of the finger 37, the levers 40 and 42 are operated so as to shift the rod 17 and free the other galley. The new positions which the fingers 37 then assume bring different portions of their curved sides in contact with the stops 39, so that the one which has just been pulled by the galley is thereafter held farther in by said stud and the other finger is allowed to move out into position to be in its turn operated by its galley when the stop 45 on the end of the latter shall reach that point. These operations will be evident from an inspection of the plan views of the drawings, particularly Fig. 4, where the parts just described are shown on an enlarged scale. At the same time that the bar 17 is shifted the first feeding-finger 22 is thrown out of operation and the other one is thrown in. This is accomplished by a partial revolution of the studs 25, which are operated by levers 50, connected by links 51 to the ends of a lever 52, which is rigidly attached to the lever 40 by means of the bolt 40$^a$, so as to operate therewith. A spring 53 is provided, which presses against the forwardly-projecting arm of the lever 40, so as to hold the same securely in whichever of its two normal positions it may have been placed, as above described.

After the galleys have passed the feeding mechanism above described they pass over the rollers or wheels 15$^a$, which are held by levers 55. These levers are pivotally supported at their rear ends, as shown at 60, (see Fig. 6,) and are supported at their forward ends by the levers 61, which are pivotally attached at their lower ends and are held normally in position by rods 62, the rear ends of which are secured to the lower ends of levers 63, which are pivotally secured to 60, and the upper ends of which are connected at 67 to links 64. These links 64 are provided with slots 65, through which pass bolts 66, adjustable horizontally in the slots. When the galleys pass to their extreme rearward position, their forward ends move along the sides of the links 64 and finally engage the laterally-extending bolts 66 and push the same back, thereby operating the levers 63 and rods 62 and moving the levers 61, so that they no longer support the forward ends of the levers 55, which thereupon drop and said levers assume an inclined position and permit the galleys to roll forward over the wheels 15$^a$ and the traveling belts 68, which pass over the idle pulleys 69 and driving-pulleys 70, which belts convey the galleys again to the front of the machine and deposit them on the shelf 71. When the galleys pass off from the wheels 15$^a$ and the levers 55 are thereby relieved of their weight, the said levers are raised to their former position by the action of the spring 72, and the supporting-levers 61 are returned to their former position by the action of the spring 73. The belt 68 when weighted with a galley is supported by brackets 68', carried on the inner sides of the frame 11. The extreme movement of the galley toward the rear of the machine is not brought about by the fingers, but by the insertion of a new galley on that side of the bed. In Fig. 3 one galley is shown as having been fed to its limit by the fingers and only awaits the insertion of a new galley to cause it to operate the supporting-levers 61 through the link 64 and rod 62.

At the front of the machine are located inking-rollers 75, journaled in upwardly-projecting parts 76. These rollers are driven by friction by the roller 77, which also serves to spread and distribute the ink which is applied to the former. The roller 77 is provided with a pulley 78 on the end of its shaft, over which passes a belt 79, which runs to the pulley 80 on shaft 81, on which shaft there is another pulley, 82, over which passes a belt 83, which runs to the pulley 84, which is operatively connected to the pulley 85, driven by the belt 86, which runs to pulley 87, operatively connected to pulley 88, driven by belt 89, leading to a pulley on the main driving-shaft 90, upon which shaft also the cam 31, heretofore mentioned, is secured. The galleys when they are introduced into the machine pass under the inking-rollers 75, upon which a supply of ink has been spread, and the type in the galleys is thereby inked for printing the addresses.

The roll of paper 95 for the wrappers upon which the addresses are to be printed is supported on upwardly-extending arms 96. The web of paper is passed over the feeding-roller 97 and between that and the roller 98, then down and under roller 99, then up over the roller 100, which is elastically supported by springs 101, then down under roller 102, then back under the devices which intermittently depress the paper upon the type in the galleys, as hereinafter described, then under roller 103, then over roller 104, which is supported by arms 105, then between rollers 106 and 107, and is wound upon the roll 108. The said roll is wound upon a core or shaft 109, the ends of which are held by journal-pieces 110, which slide vertically on standards 111, and the roll rests upon the rollers 107 and 112 and is revolved thereby. The said rollers 107 and 112 have at their ends gear-wheels 113 and 114, (see Fig. 2,) which engage with a gear-wheel 115 on the shaft 116 of the roller 106, and are thereby driven. The mechanism for driving the shaft 116 and gear-wheel 115 is as follows: The shaft 116 is suitably journaled in the side frames 117 and the bracket 118 and on its outer end carries a gear-wheel 120, which rotates loosely thereon and whose hub 121 is provided with a radial arm 122, carrying a pawl 123 at its outer end, Figs. 7 and 8. Geared in the teeth of the wheel 120 are corresponding teeth at one end of a rack-bar 124, whose other end is adjustably secured to a crank-arm 125, carried by a shaft 126, journaled in a bracket 127, carried by that side of the upright frame. On the inner side of the bracket 127 and frame of the machine and on the inner end of the shaft 126 is a gear-wheel 128, which meshes with and is driven by a gear-wheel 129 on the main driving-shaft 90. With the rotation of the gear-wheel 128 and the crank-arm 126 the bar 124 is reciprocated and the wheel 120 and its arm 122 given an oscillating motion on the shaft 116. The pawl 123 plays in the teeth of a ratchet-wheel 130, keyed on the shaft 119, and its movement with the oscillation of the arm 122 and wheel 120 is regulated by the longitudinal thrust of the rack-bar 124. This thrust is increased or decreased by adjusting the pivotal point of the rack-bar at a greater or less distance from the center of the shaft 126 of the crank-arm 125. The movement of the ratchet-wheel 130 carries the roller 106 through a corresponding arc, and any increase or decrease of this arc in the ratchet results in the feed of so much more or less paper from the supply-roll 95, and consequently provides for wrappers of desired lengths and the proper disposition of the address on these wrappers. The stem 131 of pawl 123 is loosely secured to the arm 122 by the nut 132, and the pawl has a depending arm 133, carrying a lateral stud 134, which plays in a slot 135 at the middle of a yoke 136. This yoke 136 is composed of a body and two spring-arms 137, which embrace a collar 138, secured to the shaft 119, and carry in sockets at their outer ends friction-blocks 139, which are pressed against the collar by the tension of the arms. Another friction-block is carried in a socket in the body of the yoke and is held against the collar by the gripping action of the spring-arms. When the arm 122 and pawl 123 are swung to the left in Fig. 7 the initial friction of the blocks 139 on the collar 138, which is stationary, causes the slot 135 to retard the movement of the stud 134 and the arm 133, and consequently throw the pawl down into engagement with the teeth of the ratchet-wheel 130. When the rack-bar begins its reverse action, however, the shaft 119 and the collar 138 are left at rest and the friction of the blocks 139 again retards the yoke which holds the stud 134 and causes it and its arm 133 to be thrown out of the perpendicular line shown in Fig. 7 and the pawl 123 to be thrown up out of engagement with the teeth of ratchet-wheel 130. This reverse action of the yoke is very limited, as it is stopped by the lateral pin 140 on the arm 122, and the yoke is then caught and carried to the right along with the arm, the pawl still being disengaged during the movement. When the arm 122 is again swung to the left, the retarded yoke immediately carries the pawl and stud to the position shown, causing the pawl to engage the teeth and turn the ratchet-wheel 130 through an arc equal to that traversed by the arm and carrying the shaft 119 with it. While we have shown in Figs. 7 and 8 the device above described, we do not claim the same in this application, as it will form the subject-matter for a separate application, and it is obvious that the object sought may be obtained by a simple pawl-and-ratchet movement. It will thus be seen that the movement of this end of the web of paper is intermittent, and the duration of this movement is readily varied, while the movement of the paper-feed roll 97 is continuous and is brought about by means of a friction-disk 141 on the outer end of the shaft 142 of the roller 97 and driven by the pulley 143 on the vertical shaft 144, which carries on its lower end a miter-gear 145, driven by a corresponding miter-gear 146 on a shaft 147, journaled in the side of the frame of the machine and having on its inner end a pinion 148, which meshes with the gear-wheel 149, meshing with the wheel 129 on the main drive-shaft 90. The feed and the motion of the paper, it will therefore be seen, are caused by the wheel 129 and the gear-wheels 128 and 149, and at a certain period during the intermittent movement at the printed end of the web a certain amount of slack accumulates between the rollers 97 and 102 and which is gathered up by the tension-roller 100 until consumed by the movement of the roller 106. The hub of disk 141 in encircled by a spring 141$^a$, which is under tension between the disk and the framework 96 and serves to press the disk against the friction-pulley 143 to insure the positive driving of the same. Suitable means may be adopted to elevate or lower the pulley along the face of the disk in order to vary the speed at which the disk is driven; but this feature we have not considered it necessary to show.

Having described the mechanism which provides for the movement of the galleys and the paper, we will now point out and describe the means for effecting the printing of the address on the paper.

The driving-shaft 90 near each side of the machine carries cam-faced disks 150, which control and operate plunger-rods 151 by means of rollers which play in the grooves of the disks. These plungers after passing through bearings in the bed of the machine are united at their upper ends by a cross-bar 152, which is provided with slotted bearings 153 for the reception of the stems 154 of the spring-pressed blocks 155. These blocks 155 have their lower faces covered with felt, rubber, or other suitable material to effect an impression of the type 36 upon the paper, and their stems 154 have lateral pins 156, which play in the slots 157 of the bearings 153 and adjusting-nuts 158. Springs 159 encircle these stems between the blocks and the bearings 153 and cause the blocks to yield to any pressure put upon them. A bracket 160, secured to one side of the bed-plate and extending laterally across same, serves to guide the blocks. The two blocks shown in the drawings each correspond with the column of addresses in the two galleys already described and are adapted to descend and cause the impression to be made on the paper when the web and the galley are at rest and ascend while the galley is carried forward by its mechanism, and the winding of the web is effected by the roller 106. The paper after passing under the blocks 155 is carried through an opening 161 in a frame 162, arranged parallel with the cross-bar 152 and having several—preferably two—vertically-moving punches 163, playing through the frame and across the slot. These punches are actuated by a flat spring 164, supported by a rod 165, adjustably carried by a standard 166, rising from the cross-bar 152 and returned to their normal positions by coiled springs 167, which surround them. The depression of the cross-bar 152 causes the depression of the punches 163 and the perforation of the paper at this point. The object of these perforations is to adapt the addressed paper to use in an improved wrapping and folding machine and for which Letters Patent have been granted. The power part of the frame 162, which the punches enter, is hollow and receives the bits of paper cut from the perforations. These in time would accumulate so as to clog the machine, and to prevent this accumulation I provide the machine with a bellows 168, which supplies a blast of air to the hollow framework through the tube 169 and expels the bits of paper at the other end. The crank-arm 170 on the shaft 27 is connected with the bellows 168 by means of a rod 171, and when the crank-arm is rocked the bellows is compressed, being held rigid by a cross-bar 172.

At the front of the machine where the galleys are received is a roller 174, carried by levers 175, pivoted on a shaft 176, which is supported by the side frames 11, and the rear ends of the levers are connected by means of a link 177 with the frame 178, which carries the fountain-roller 77 and swings on the shaft 81. Before the machine is put in operation the various belts which drive the roller 77 are through the pulley 179, which is secured to the driving-pulley 180 and moves continually therewith, driven so as to cause the roller 77 to spread the ink on the rollers 75 at a uniform rate of speed. When a galley is run into the ways 14 of the bed 12, at the instant it bears upon roller 174 the same is depressed, elevating the rear end of its lever and throwing-up the frame 178, carrying the roller 77 away from the rollers 75 and leaving them free to travel with the type of the galleys. As soon as the galley leaves the roller 174 the supply-roller 77 drops back and replenishes the rollers 75. With operation of the rod 21 to remove the slide-bar 16 from the path of the left-hand galley the rod oscillates a crank-arm 181, secured to a shaft 182, which is journaled in a hanger 183 and the side frame 11. The shaft 182 carries on its inner end a brake-shoe 184 to engage and operate a brake 185 on the shaft 90, while the outer end carries a cam-faced lever 186, whose office will be hereinafter explained. The driving-pulley and the pulley 179 are loosely carried on the shaft 90; but the shaft has pinned or keyed to it a sleeve 187, to which is pivoted, by means of pins 188, a bell-crank lever 189, one of whose arms is normally in the path of the lever 186 and whose other arm bears against a pin 189$^a$, fitting in a socket in the shaft 90 and pressed outward by a spring 191 in the bottom of the socket. While the bell-crank occupies the operative position, (shown in Fig. 5,) a lateral pin projecting from the side of the pulley 179 engages it and sweeps the bell-crank around, causing the rotation of the shaft 90 and the operation of the machine. When the galleys have passed through the machine, the rod 21 is pushed in and the lever 186 caused to swing down into the path of the outer arm of the bell-crank lever, when the arm striking the cam-face is crowded back and the pin 190 of the pulley 179 allowed to pass on. At the same time the shoe 184 is applied to the periphery of the brake-disk 185 and the machinery stopped immediately.

Occasions may arise when it is desired to stop the machine while a galley is still in the left-hand side, and to provide for such a contingency we make a yielding connection between the slide-bar 16 and the lever, as is shown in Fig. 9, where the bar is shown with a slot 192, in which plays a yoke 193, carrying two rollers 194, between which moves the end of the lever 18. The stem 195 of the yoke after passing through a crosspiece 196 in the slot is encircled by a spring 197, which is held under the necessary tension by the nut 198 on the threaded end of the stem. The rear end of the bar 16 has an upturned hook or finger-piece 199, Fig. 3, which affords the operator an opportunity for retracting the bar without interfering with the position of the lever 18.

At the rear end of the plate 12$^a$ are pivoted two pawls 200, which engage the type-lines 36 after they have passed the printing-point and serve to effectually guard against the accidental reversal of the movement of the galleys. A spring 201 presses these pawls into contact with the type and into the space between them. While the fingers 37 also engage the type and prevent any rear movement of the galleys, the pawls 200 perform that office when the galleys move beyond the range of the fingers.

Having thus described our invention, what we claim as new, and desire to secure by Letters Patent, is—

1. In an addressing-machine, the combination with a frame having a bed and galleys adapted to hold separate lines or groups of lines of type and to be slid over the bed, of feeding-fingers adapted to engage the successive lines or groups of lines of type of one or the other of the galleys and move the same the distance occupied by the line or group of lines, and means for moving the fingers to enable them to propel the galleys.

2. In an addressing-machine, the combination with a frame provided with antifriction-rollers and a bed, of galleys adapted to hold lines of type and to travel, one at a time, over the bed and rollers, pivoted fingers adapted to engage successive lines of type of one or the other galley, sliding blocks carrying the pivots of the fingers, and means for actuating the blocks.

3. In an addressing-machine, the combination with a frame having a bed, of galleys adapted to contain separate lines or groups of lines of type and to travel on either side of the bed, feeding-fingers adapted to alternately engage successive lines or groups of lines of the galleys, means for actuating the feeding-fingers and means for shifting the feeding-fingers so that but one is operating at a time.

4. In an addressing-machine, the combination with a frame having a bed, of galleys adapted to slide on either side of the bed and carry separated lines or groups of lines of type, feeding-fingers engaging the type of one of the galleys on each side of the bed alternately, means for actuating the fingers so as to advance a galley a certain distance and means operated by the advancing galley to shift the fingers for engagement with the galley on the other side of the bed.

5. In an addressing-machine, the combination with a frame having a bed, of galleys adapted to travel on either side of the bed and carrying lines of type, pivoted fingers adapted to be alternately in and out of engagement with the lines of type, sliding blocks carrying the pivoted fingers, means for sliding the blocks to cause the fingers to reciprocate longitudinally and advance a galley a predetermined distance, a projection carried by the galleys and means connected with the feeding-fingers adapted to strike the projection and throw out of operation the feeding-finger of that galley and render operative the finger for the galley of the other side of the machine.

6. In an addressing-machine, the combination with a frame having a bed, of galleys adapted to travel over the bed alternately and carry separated lines or groups of lines of type, feeding-fingers adapted to alternately engage a line of type of one or the other galley, sliding blocks carrying the fingers, means for sliding the blocks, a plate carried by the bed between the two galleys, a sliding bar carried by the plate and obstructing the movement of the inoperative galley, projections carried by the galleys and adapted to shift the obstructing-bar and simultaneously disengage one feed-finger and engage the other, and means carried by the plate, connected with the slide-bar and feed-fingers, and adapted to be struck by the projections and shift those parts.

7. In an addressing-machine, the combination with a frame having a horizontal bed, of galleys adapted to travel on each side of the horizontal bed and carrying separated lines or groups of lines of type, feeding-fingers on each side of the bed adapted to be alternately shifted so as to be thrown in and out of engagement with the lines of type, sliding blocks carrying the feed-fingers, means for sliding the blocks, a plate carried by the bed between each galley, a slide-bar carried by the plate and adapted to obstruct the movement of either one galley or the other, projections carried by the galleys at their ends, a four-arm lever pivoted to the plate, curved fingers connected with the lever and adapted to engage the projections carried by the galleys, and change the position of the lever and means connected with the lever for automatically carrying and holding one feed-finger beyond the range of the lines of type and allowing the other feed-finger to engage the lines of type or vice versa.

8. In an addressing-machine, the combination with a frame having a horizontal bed, of galleys adapted to travel on each side of the bed and carrying separated lines or groups of lines of type and projections, feeding-fingers adapted to be alternately shifted and held out of engagement with the lines of type, means for alternately holding the fingers out of range of the lines of type, a plate secured to the bed between the galleys, a sliding bar carried by the plate and adapted to be moved in the path of the projection of one or the other galley and prevent its reverse movement, means for sliding the bar, curved fingers adapted to engage the projection of the moving galley and means connected with the engaging curved finger for effecting the shifting of the bar and actuating the means for holding the feed-fingers out of range of the lines of type.

9. In an addressing-machine, the combination with a frame having a bed, of galleys adapted to travel over the bed one at a time and carry separated lines or groups of lines of type, feeding-fingers adapted to alternately engage the type-lines of one or the other galley, sliding blocks carrying the feeding-fingers, oscillating levers connected with the sliding blocks, and means for rocking the oscillating levers.

10. In an addressing-machine, the combination with a frame having a bed, of galleys adapted to travel over the bed and carry separated lines or groups of lines of type, feeding-fingers adapted to be thrown into engagement with the type of the galleys alternately, means for alternately shifting the fingers, sliding blocks carrying the feed-fingers, a shaft journaled in the frame of the machine, crank-arms carried by the shaft and connected with the sliding blocks by links, an arm carried by the shaft, a driving-shaft and a cam on the driving-shaft adapted to rock the arm on the first shaft.

11. In an addressing-machine, the combination with a frame having a bed, of galleys adapted to travel over the horizontal bed and carry separated lines or groups of lines of type, sliding blocks carried by the bed, guideways with retaining means for the sliding blocks, feeding-fingers pivoted to the blocks and alternately engaging the type in one or the other galley, means carried by the galleys for alternately disengaging the feeding-fingers and means for actuating the sliding blocks.

12. In an addressing-machine, the combination with a frame having a horizontal bed, of galleys adapted to traverse the bed, means for propelling the galleys, a laterally-disposed and sliding bar on the bed adapted to be set in the path of one of the galleys to limit its movement along the bed, a driving-shaft, a pulley loosely mounted on the driving-shaft, means for connecting the pulley with the driving-shaft, and means interposed between the connecting means and the sliding bar for starting the machine when the bar is slid out of the path of the galley.

13. In an addressing-machine, the combination with a frame having a horizontal bed, of galleys adapted to traverse the bed, means for propelling the galleys, a laterally-disposed and sliding bar adapted to be set in the path of one of the galleys, a spring-connected yoke carried by the sliding bar, a crank-arm carried by a vertical shaft journaled in the bed of the machine said crank-arm having its free end connected with the yoke, a second crank-arm carried by the vertical shaft, a lever fulcrumed to the under side of the bed and having one end connected with the second crank-arm by a link, a starting-rod connected with the other end of the lever, a driving-pulley, a driving-shaft carrying same and having means for connecting and disconnecting to itself the driving-pulley, and means connected with the starting-rod and lever for operating the connecting and disconnecting means on the driving-shaft.

14. In an addressing-machine the combination with a frame having a bed, of galleys adapted to traverse the bed, feeding-fingers adapted to propel one or the other galley, means for operating the feeding-fingers, a laterally-disposed and sliding bar adapted to be set in the path of one or the other of the galleys, a forked lever connected with the sliding bar, crank-arms carried by a vertical shaft journaled in the bed of the machine, one of the arms being connected with the forked lever, hooked fingers carried by opposite arms on the vertical shaft and adapted to shift the latter; slugs or projections carried in the lower ends of the galleys and engaged by one or the other of the hooked fingers, means for disengaging the hooked finger after it has been carried a limited distance by the slug, a spring connected with an arm of the vertical shaft to hold the same in one of two shifted positions, arms secured to the vertical shaft beneath the bed, cams adapted to engage the feeding-fingers and hold them alternately out of play and connections between the cams and the arms beneath the table for operating the cams when the hooked fingers shift the vertical shaft.

15. In an addressing-machine, the combination with a frame having a bed, of galleys carrying separated lines of type or groups of lines of type and adapted to traverse each side of the bed of the machine, sliding blocks moving longitudinally along the bed, means for sliding the blocks, feeding-fingers pivoted to the blocks and adapted to engage the lines of one or the other galley, cams controlling the swing of the fingers and adapted to throw one or the other out of line of engagement with the lines of type, projections or slugs carried by the galleys, and means adapted to engage the slugs and reverse the action of the cams.

16. In an addressing-machine, the combination with a frame having a bed, of galleys carrying separated lines or groups of lines of type and adapted to travel on different sides of the bed, blocks carried by the bed and adapted to reciprocate parallel with the movement of the galleys, means for reciprocating the blocks, pivoted feed-fingers carried by the blocks and adapted to alternately engage the type of the galleys, cams with shafts journaled in the bed and acting upon the fingers so as to hold one or the other finger out of engagement with the lines of type, crank-arms at the lower ends of the cam-shafts, slugs or projections in the galleys, a plate secured to the bed between the path of the galleys, a four-armed lever pivoted to the plate, curved fingers carried by opposite arms of the lever and held in the path of the projections or slugs to engage the same so as to shift the four-armed lever, a lever secured to the pivot of the latter, links connecting the ends of the same to the crank-arms on the shafts of the cams and a spring connected with one of the arms of the four-armed lever to hold it to one side or the other.

17. In an addressing-machine, the combination with a frame having a bed, of galleys adapted to traverse each side of the bed, independently-operating feed-fingers for propelling the galleys, means for operating the feed-fingers, inking-rollers carried by brackets at the front end of the machine, a yoke pivoted to the brackets and carrying at its free end an ink-supply roller which is normally adapted to rest on the inking-rollers, means for rotating the supply-roller, levers pivoted to the frame, the inner ends of which are connected with the yoke by a link, a roller carried by the outer ends of the levers and adapted to be depressed when either galley with type is introduced into the machine and to cause the supply-roller to leave the inking-rollers.

18. In an addressing-machine, the combination with a frame having a bed, of galleys adapted to move singly along the bed, means for moving the galleys, impression-blocks adapted to carry the paper to be addressed against the face of the type in one of the galleys, a cross-bar carrying the stems of the impression-blocks, springs interposed between the blocks and the cross-bar, vertical rods carrying the ends of the cross-bar and playing through openings in the bed, and means for actuating the vertical rods.

19. In an addressing-machine, the combination of the following parts: a power-shaft, cams carried by the same, a horizontal bed, vertically-moving rods actuated by the cams and passing through the bed, a cross-bar joining the vertical rods above the bed, impression-blocks with stems, bearings on the cross-bar for the stems each having a slot to receive a pin on the stem and springs interposed between the blocks and the bearings.

20. In an addressing-machine, the combination with a bed, of a laterally-disposed and slotted frame carried by the bed, punches playing through the upper wall of the slot, a cross-bar moving vertically, means for moving the cross-bar, a spring adjustable on the cross-bar and pressing on the punches to actuate same when the cross-bar descends, and means for removing the bits of paper removed by the punches.

21. In an addressing-machine, the combination with a bed, of a laterally-disposed and slotted frame carried by the bed, punches playing vertically through the horizontal walls of the slot, a compartment for the reception of waste beneath the slot and open at one end, a bellows discharging into the compartment at the closed end, a cross-bar carrying an adjustable spring which is adapted to depress the punches when the cross-arm descends, means for operating the cross-bar and means for operating the bellows.

22. In an addressing-machine, the combination with a bed, of galleys adapted to move singly along the bed, means for propelling the galleys, a web of paper, means for feeding the web of paper, impression-blocks, a cross-bar carrying the blocks, vertical rods carrying the cross-bar at each end and adapted to move vertically through the bed, a power-shaft, means carried by the same to actuate the vertical rods, punches adapted to operate simultaneously with the impression-blocks to perforate the paper when the address is printed, a presser-spring carried by the cross-bar and adapted to operate the punches, means for removing the waste from beneath the punches and means connected with the power-shaft for operating this means.

23. In an addressing-machine, the combination with a frame having a bed, of galleys adapted to traverse the bed one at a time, means for propelling the galleys, antifriction-rollers, levers carrying the rollers and pivoted beneath the bed, pivoted arms supporting the free ends of the levers, and means automatically operated by the galleys to rock the arms and release the free ends of the levers.

24. In an addressing-machine, the combination of a frame having a bed provided with openings, of galleys adapted to move singly along each side of the bed, means for moving the galleys, levers pivoted at one end in the openings, rollers carried by the levers, pivoted arms supporting the levers at their free ends, means operated by the galleys to automatically release the levers from the support of the pivoted arms when the galleys leave the bed and reach the rollers on the levers, endless belts moving beneath the normal position of the levers and adapted to receive the galleys when the levers drop, means for moving the belts and means for returning the levers to their normal positions.

25. In an addressing-machine, the combination with a frame having a bed provided with openings, and levers pivoted beneath the bed and within the openings, of galleys adapted to move along the bed of the machine and on to the levers, means for moving the galleys, antifriction-rollers on the levers, swinging arms supporting the free ends of the levers, means for returning the swinging arms to their normal positions, a shaft rigidly carrying the pivoted ends of the levers, arms secured to the hubs of the levers, springs attached to the latter arms and to the frame of the machine and adapted to return the levers to their normal positions, levers fulcrumed on the shaft, links carried by the upper ends of the fulcrumed levers in the paths of the galleys, adjustable lateral projections carried by the links, links connecting the lower ends of the fulcrumed levers with the swinging arms, rollers carried by the shaft, endless belts passing around the rollers and in the path of the galley-carrying levers and means at the front end of the machine for carrying and driving the endless belt.

26. In an addressing-machine, the combination with a frame having a horizontal bed provided with openings, of galleys adapted to traverse the bed, pivoted levers arranged in the openings and adapted to receive the galleys, antifriction-rollers carried by the levers, means for retaining the levers in their normal position, means for releasing a lever after it has received its galley, endless bands traveling in the path of the released lever to receive the galleys, pulleys on the pivotal shaft of the levers and carrying the bands, pulleys at the front end of the frame, motive means for the latter pulleys, shelves at the front of the machine adjacent to the motive pulleys and brackets on the inner sides of the frame parallel with the upper parts of the bands to support same while carrying the galleys.

27. In an addressing-machine, the combination with a frame with an upright structure, and a roll of paper carried by the same, of constant feeding means, intermittent rewinding means, means for addressing the paper between the feeding and the rewinding, means for taking up the slack paper between the feeding means and the addressing means, a friction-disk driving the feed-rolls, a rack-bar and ratchet-wheel driving the rewinding-rolls, a power-shaft, means connecting the friction-disk with the power-shaft, and means interposed between the power-shaft and the rack-bar to reciprocate same.

28. In an addressing-machine, the combination with a frame, having an upright structure, and a roll of paper carried by the said upright structure of feeding-rollers, a friction-disk carried by the shaft of one of the rollers, a friction-pulley adapted to drive the disk, a vertical shaft carrying the pulley at one end, a miter-gear at the other end of the vertical shaft, a stud carrying a corresponding miter-gear, gearing with the first, and a pinion; a gear-wheel meshing with the pinion, and a gear-wheel on the power-shaft meshing with the gear-wheel which drives the pinion, printing means for addressing the paper, rewinding means and intermediate gearing meshing with the gear-wheel on the power-shaft and means for taking up the slack between the feed-rollers and the printing means.

29. In an addressing-machine, the combination with a roll of paper, and means for feeding the paper continuously, of printing means for addressing the paper, means for taking up the slack interposed between the printing and continuous feeding means, an intermittent rewinding-roller, a weighted rewinding-shaft carrying the addressed paper, intermediate rollers between the intermittent roller and the rewinding-shaft and its paper-roll and supporting and rotating the latter, a ratchet-wheel on the shaft of the rewinding-roller, a pawl adapted to carry the ratchet-wheel through a predetermined arc, a gear-wheel connected with the pawl, a rack-bar operating the gear-wheel and means for reciprocating the rack-bar.

30. In an addressing-machine, the combination with a paper-roll and paper-feeding means, of printing means, perforating means connected with the printing means, a rewinding-roller, a shaft for the rewound roll, interposed supporting and rotating rollers, a reciprocating rack-bar, intermittent means operated by the rack-bar for actuating the rewinding-roller, a driving-shaft with a gear-wheel, a gear-wheel meshing with the wheel on the driving-shaft, a crank-arm on the shaft of this second gear-wheel and means for adjustably connecting the end of the rack-bar with the crank-arm.

31. In an addressing-machine the combination with a bed, of galleys adapted to traverse the bed intermittently, alternately on one side and then on the other, means for alternately intermittently feeding the galleys, rollers adapted to ink the type of the galleys, an ink-supply roller, means for automatically removing the supply-roller from the inking-rollers when a galley enters a machine, a web of paper, continuous feed means for the web of paper, intermittent printing means, means for intermittently rewinding the web after the address has been printed and means carried by each galley for shifting the feed to the other galley when the last address of the first galley has been printed.

32. In an addressing-machine, the combination with a bed, of galleys with addresses in type adapted to traverse the same, printing means, intermittent feeding means adapted to feed one galley at a time, means carried by each galley at its lower end which as the galley carries the last address away from the printing means shifts the feeding means into engagement with a new galley, inking means, a web of paper, continuous paper-feeding means, means for taking up the slack paper between the paper-feed and the printing means, punching means, and adjustable rewinding means to allow the printing of the addresses at predetermined distances apart on the paper.

33. In an addressing-machine the combination with a bed, of galleys with type-set addresses, a sliding bar adapted to limit the movement of the first galley along the bed, inking means, paper-feeding means, printing means, intermitting and alternating feed means for the galleys, punching means for the paper, rewinding means and means for simultaneously starting the machine and shifting the sliding bar.

34. In an addressing-machine the combination with a bed, of galleys adapted to be fed one at a time along the bed, means for feeding the galley, means for shifting the feed of the galleys, a sliding bar in the path of the first galley, means for removing the sliding bar when the machine is started, a bar shifting to obstruct the path of the galley remaining at rest, and means connected with the feed-shifting means for shifting the second bar from the path of the galley which the feed means is about to operate upon.

In witness whereof we have hereunto signed our names, this 21st day of October, 1903, in the presence of two subscribing witnesses.

EDWARD P. SHELDON.
WARD B. STORY.

Witnesses:
EDMOND CONGAR BROWN,
EDWARD G. DELANEY.